United States Patent [19]

Okamoto et al.

[11] Patent Number: 5,636,312
[45] Date of Patent: Jun. 3, 1997

[54] VIDEO IMAGE MIXING APPARATUS

[75] Inventors: Manabu Okamoto; Takashi Yoshimi; Hiroyasu Matsuura; Noriyoshi Takeya; Hitoshi Yamazaki; Masakazu Miyazaki; Hirofumi Matoba, all of Tokorozawa, Japan

[73] Assignee: Pioneer Electronic Corporation, Tokyo, Japan

[21] Appl. No.: 168,269

[22] Filed: Dec. 17, 1993

[30] Foreign Application Priority Data

Dec. 17, 1992 [JP] Japan .................................... 4-337457

[51] Int. Cl.$^6$ ....................................................... H04N 9/89
[52] U.S. Cl. ............................................... 386/19; 386/17
[58] Field of Search ................................. 358/310, 335, 358/324, 326, 320, 319, 337; 348/533, 606, 607; 386/19, 17

[56] References Cited

U.S. PATENT DOCUMENTS

| | | | |
|---|---|---|---|
| 4,733,311 | 3/1988 | Yoshinaka | 358/320 |
| 4,956,720 | 9/1990 | Tomisawa | 358/324 |
| 5,097,348 | 3/1992 | Suetaka | 358/335 |
| 5,134,498 | 7/1992 | Yokoyama | 358/337 |
| 5,175,629 | 12/1992 | Lee et al. | 358/310 |
| 5,319,466 | 6/1994 | Gedl | 358/310 |

*Primary Examiner*—Andrew Faile
*Assistant Examiner*—Robert Chevalier
*Attorney, Agent, or Firm*—Sughrue, Mion, Zinn, Macpeak & Seas

[57] ABSTRACT

A video image mixing apparatus which can prevent a fluctuation of a mixed video image by a mixed video signal in the case where a playback video signal obtained by playing a recording medium in a special playing mode and a graphics video signal. When a discontinuity of the phase of a color burst signal in the playback video signal obtained by playing the recording medium is detected, the playback video signal and the graphics video signal are delayed by a predetermined time period and the delayed signals are mixed subsequently, thereby keeping the phases of chroma signals of the playback video signal and graphics video signal equal even in a special playing mode such as a still image reproducing mode or the like. In another embodiment, the mixed video signal of the playback video signal and graphics video signal is delayed by a predetermined time and is generated.

4 Claims, 4 Drawing Sheets

VIDEO IMAGE MIXING APPARATUS

BACKGROUND OF THE INVENTION

1. Field of the Invention

The present invention relates to a video image mixing apparatus for mixing a playback video signal obtained by playing a recording medium such as a video disc or the like and a graphics video signal produced on the basis of image data read-out from a memory device.

2. Description of Background Information

The color video signal of the NTSC system is subjected to various limitations because considerations are given to maintain the compatibility so that a video image and audio signals are reproduced with a monochrome (black and white) television receiver as well. For example, the frequency of a chroma signal is selected to a sufficiently high frequency of about 3.58 MHz, in order to minimize the interference with a luminance signal and to enable the reproduction of the original color information. Specifically, assuming that the frequency of a horizontal sync signal is labelled as $f_H$, the frequency $f_{SC}$ of the chroma signal is given as follows.

$$f_{SC} = f_H \times 455/2$$

Namely, since the frequency $f_{SC}$ is odd number times of one half the frequency of the horizontal sync signal, the phase of the chroma signal is inverted every frame.

A color video signal recorded on the recording medium such as a video disc or the like also has a chroma signal whose phase is inverted every frame in accordance with the above-described standard. Consequently, when the recording medium is played, the reproduction in the ordinary reproducing mode is performed to produce a color video signal in which the continuity in phase alternation of the chroma signal is maintained. On the other hand, in a special playing mode e.g., still image reproducing mode, there is a case where the video signal of the same frame is repetitively reproduced or the video signal consisting only of the odd or even number frames is continuously reproduced in a double-speed reproducing mode. In such a special playing mode, the video signal having the chroma signal of the same phase is continuously reproduced and the chroma signal whose phase is inverted every frame cannot be provided, so that color synchronization of a resultant video image is distorted, to make the video image colorless.

In a conventional apparatus of a video disc player or the like, therefore, a delay line having a delay time of about 140 nsec ($\approx 1/(2\times 3.58$ MHz)) corresponding to one-half the period of the chroma signal is arranged on a video signal line. Therefore if the discontinuity of the phase alternation of a color burst signal occurs in the special playing mode, the video signal is delayed by about 140 nsec (nanoseconds) for every other frame, so that the phase shift is executed.

In cases where a video signal of a still video image (hereinafter, referred to as a still image video signal) obtained by playing the recording medium by such a conventional apparatus in the special playing mode is mixed (combined) with a video signal of a graphics video image (hereinafter, referred to as a graphics video signal), since the graphics video signal is produced from digital data, the latter signal is obtained as a stable video signal including no time fluctuation component. However, since a frame that is delayed by about 140 nsec exists in the still image video signal mentioned above, there exists a problem that a CRT display apparatus which receives the mixed video signal is subjected to the influence by the time fluctuation of the input signal. Thus, a fluctuation of video image on a display screen is produced whichever video signal the display apparatus traces.

OBJECT AND SUMMARY OF THE INVENTION

It is an object of the invention to provide a video image mixing apparatus in which a fluctuation of a mixed video image due to the time fluctuation of the mixed video signal is prevented when combining a playback video signal obtained by playing a recording medium in a special playing mode and a graphics video signal.

According to the first aspect of the invention, there is provided a video image mixing apparatus for mixing a playback video signal obtained by playing a recording medium and a graphics video signal formed on the basis of image data read-out from a memory device, wherein the apparatus comprises: phase discontinuity detecting means for detecting a discontinuity of a phase alternation of a color burst signal in the playback video signal, thereby generating a discontinuity detection signal; first delay means for delaying the playback video signal by a predetermined time period; second delay means for delaying the graphics video signal by the predetermined time period; and mixing means for mixing the playback video signal supplied from the first delay means and the graphics video signal supplied from the second delay means when the discontinuity detection signal is generated.

According to the second aspect of the invention, there is provided a video image mixing apparatus for mixing a playback video signal obtained by playing a recording medium and a graphics video signal formed on the basis of image data read-out from a memory device, wherein the apparatus comprises: phase discontinuity detecting means for detecting a discontinuity of the phase alternation of a color burst signal in the playback video signal, thereby generating a discontinuity detection signal; mixing means for producing a mixed video signal of the playback video signal and the graphics video signal; and delay means for delaying the mixed video signal supplied from the mixing means by a predetermined time period and generating the delayed signal when the phase discontinuity detection signal is generated.

In the video image mixing apparatus according to the first aspect of the invention, when the discontinuity of the phase alternation of the color burst signal in the playback video signal is detected, the playback video signal and the graphics video signal are delayed by the predetermined time period and the delayed playback video signal and the delayed graphics video signal are mixed together.

In the video image mixing apparatus according to the second aspect of the invention, when the discontinuity of the phase alternation of the color burst signal in the playback video signal is detected, the mixed video signal of the playback video signal and the graphics video signal is delayed by the predetermined time period and the delayed signal is outputted.

DETAILED DESCRIPTION OF THE EMBODIMENTS

An embodiment of the invention will be described hereinbelow in detail with reference to the drawings.

Figure 1:
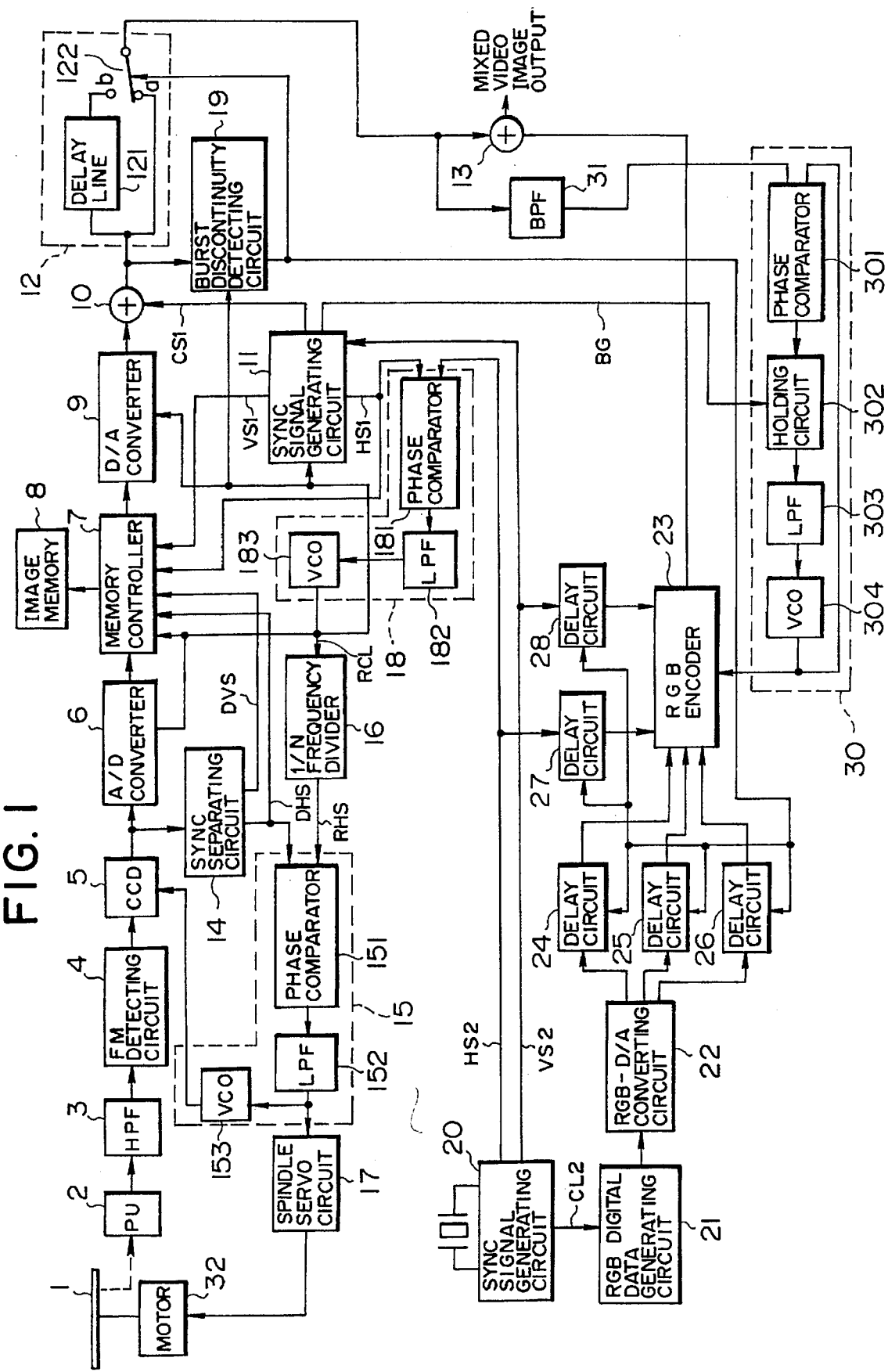
FIG. 1 is a block diagram showing an embodiment of the invention.

In an apparatus according to the first aspect of the invention shown in FIG. 1, a signal recorded on a video disc 1 is read by a pickup 2. A read RF signal generated from the pickup 2 is supplied to an HPF (High Pass Filter) 3, from which only a video signal band component is derived and supplied to an FM detecting circuit 4. The video signal demodulated by the FM detecting circuit 4 is supplied to a CCD (Charge Coupled Device) 5. The CCD 5 performs a phase control so as to remove a time base error of the demodulated video signal. An output video signal of the CCD 5 is converted into digital video data by an A/D converter 6. After that, the digital video data is supplied to a memory controller 7. The memory controller 7 controls the writing and reading operations of data for an image memory 8. The image memory 8 comprises an FIFO (First-In First-Out) and has a capacity to store the video signal of at least 1H (horizontal scan period). The video data read-out from the image memory 8 is supplied from the memory controller 7 to a D/A converter 9. The D/A converter 9 converts the read-out data into the analog video signal.

A mixer 10 is connected to an output of the D/A converter 9. The mixer 10 adds a first composite sync signal $CS_1$ to the analog video signal from the D/A converter 9. The first composite sync signal $CS_1$ is generated from a sync signal generating circuit 11. A delay circuit 12 is connected to an output of the mixer 10. The delay circuit 12 has a delay line 121 and a change-over switch 122. The delay line 121 delays the video signal generated from the mixer 10 by about 140 nsec. The switch 122 selectively relays the output signal of either one of the mixer 10 and the delay line 121 in accordance with the result of the detection of a burst discontinuity detecting circuit 19, which will be explained hereinafter. A relayed output of the switch 122 is an output of the delay circuit 12 and is supplied to a mixer 13 and a BPF 31. The BPF 31 is a filter having a center frequency of 3.58 MHz.

A sync separating circuit 14 is connected to the output of the CCD 5. The sync separating circuit 14 separates and extracts a horizontal sync signal DHS and a vertical sync signal DVS from the demodulated video signal. The separated and extracted horizontal sync signal DHS and vertical sync signal DVS are supplied to the memory controller 7. The horizontal sync signal DHS is also supplied to a PLL circuit 15. The PLL circuit 15 comprises a phase comparator 151, an LPF (Low Pass Filter) 152, and a VCO (Voltage Controller Oscillator) 153. The phase comparator 151 compares the phase of a reference horizontal sync signal RHS generated from a 1/N frequency divider 16 (N is set to, e.g., 910) and the phase of the separated horizontal sync signal DHS and supplies the result of the comparison to the LPF 152. An output voltage of the LPF 152 is set to a control voltage of the VCO 153 and is also supplied as a time base error signal to a spindle servo circuit 17. The spindle servo circuit 17 controls the rotation of a spindle motor 32 so as to set off the time base error signal.

The sync signal generating circuit 11 has a counter (not shown) and counts a reference clock signal RCL which is generated from a PLL circuit 18 by the counter and generates a first horizontal sync signal $HS_1$, a first vertical sync signal $VS_1$, and a first composite sync signal $CS_1$ according to a video signal format of the NTSC system. The generating circuit 11 also generates a burst gate signal BG indicative of a color burst signal generating period. The first horizontal and vertical sync signals $HS_1$ and $VS_1$ are supplied to the memory controller 7. The first composite sync signal $CS_1$ is supplied to the mixer 10.

The PLL circuit 18 comprises a phase comparator 181, and LPF 182, and a VCO 183. The phase comparator 181 compares the phase of the first horizontal sync signal $HS_1$ which is generated from the sync signal generating circuit 11 and the phase of the second horizontal sync signal $HS_2$ which is generated from a sync signal generating circuit 20 for graphics and supplies the results of the comparison to the LPF 182. An output voltage of the LPF 182 is set to a control voltage of the VCO 183. An oscillating frequency of an oscillation signal of the VCO 183 is equal to 4 $f_{SC}$. The oscillation signal of the VCO 183 is supplied as a reference clock signal RCL to the A/D converter 6, memory controller 7, D/A converter 9, 1/N frequency divider 16, and burst discontinuity detecting circuit 19. The A/D converter 6, memory controller 7, and D/A converter 9 operates by using the reference clock signal RCL as a timing signal.

Figure 2:
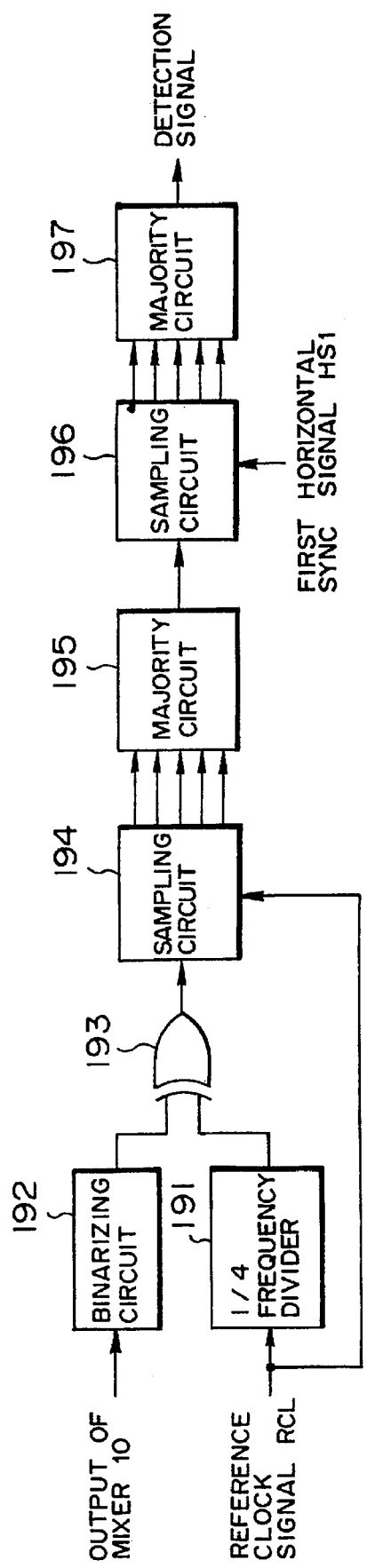
FIG. 2 is a block diagram showing a construction of a burst discontinuity detecting circuit in an apparatus of FIG. 1.

In the burst discontinuity detecting circuit 19, as shown in FIG. 2, a frequency divider 191 to divide the frequency of the reference clock signal RCL from the VCO 183 into a ¼ frequency and a binary coding circuit 192 to generate binary values from the output signal of the mixer 10 are provided. A frequency divided output of the frequency divider 191 and the binary output of the binary coding circuit 192 are supplied to an exclusive OR circuit 193. A sampling circuit 194 is connected to an output of the exclusive OR circuit 193. The sampling circuit 194 holds an output signal of the exclusive OR circuit 193 in accordance with the reference clock signal RCL by five samples and generates. A majority circuit 195 is connected to an output of the sampling circuit 194. When three or more of the five holding outputs of the sampling circuit 194 are set to the high level, the majority circuit 195 generates a high level signal. In a state other than the above case, the majority circuit 195 generates a low level output. A sampling circuit 196 is further connected to an output of the majority circuit 195. The sampling circuit 196 holds an output signal of the majority circuit 195 in accordance with the first horizontal sync signal by five samples and generates. A majority circuit 197 is connected to an output of the sampling circuit 196. The majority circuit 197 operates in a manner similar to the majority circuit 195. When three or more of the five holding outputs of the sampling circuit 196 are at the high level, the majority circuit 197 generates a high level output. In a state other than the above case, the majority circuit 197 generates a low level output. An output signal of the majority circuit 197 is set to a detection signal of the burst discontinuity detecting circuit 19.

The sync signal generating circuit 20 generates sync signals for the graphics video signal, namely, a second horizontal sync signal $HS_2$, a second vertical sync signal $VS_2$, and a second clock signal $CL_2$. In case of the graphics video signal, although a frequency of the second horizontal sync signal $HS_2$ is equal to the horizontal sync frequency of the video signal of the NTSC system, since the number of horizontal scan lines per frame is equal to 524 or 526, a frequency of the second vertical sync signal $VS_2$ differs from the vertical sync frequency of the video signal of the NTSC system. The second vertical sync signal $VS_2$ which is generated from the sync signal generating circuit 20 is supplied to the sync signal generating circuit 11. When the second vertical sync signal $VS_2$ is supplied to the sync signal generating circuit 11, the counter is reset.

The second clock signal $CL_2$ which is generated from the sync signal generating circuit 20 is supplied to an RGB digital data generating circuit 21. The RGB digital data generating circuit 21 reads out RGB data indicative of a color tone of a graphics video image stored as data in an internal memory synchronously with the second clock signal $CL_2$ and generates on a pixel unit basis. The data reading operation is executed in accordance with a predetermined program. An RGB-D/A converting circuit 22 is connected to an output of the RGB digital data generating circuit 21. The RGB-D/A converting circuit 22 converts the RGB data into the analog RGB signal. The analog RGB signal generated from the RGB-D/A converting circuit 22 is supplied to an RGB encoder 23 every RGB through either one of delay circuits 24 to 26. The second horizontal sync signal $HS_2$ and the second vertical sync signal $VS_2$ are supplied to the RGB encoder 23 through the delay circuit 27 or 28. The RGB encoder 23 converts the analog RGB signal into the composite video signal in accordance with the second horizontal and vertical sync signals $HS_2$ and $VS_2$ and a signal from a PLL circuit 30. The converted video signal is supplied to the mixer 13 as a graphics composite video signal. The delay circuits 24 to 28 are constructed in a manner similar to the above delay circuit 12. The detection signal from the burst discontinuity detecting circuit 19 is supplied to the delay circuits 24 to 28. The mixer 13 mixes, by superimposing, the video image of the graphics composite video signal to the video image of the composite video signal from the delay circuit 12.

The PLL circuit 30 comprises a phase comparator 301, a holding circuit 302, an LPF 303, and a VCO 304. The phase comparator 301 compares the phase of the color burst signal which is supplied from the BPF 31 and the phase of an oscillation signal which is generated from the VCO 304 and supplies the result of the comparison to the holding circuit 302. While the burst gate signal BG at the high level is supplied, the holding circuit 302 supplies an output signal of the phase comparator 301 as it is. While the burst gate signal BG at the low level is supplied, the holding circuit 302 holds the output signal of the phase comparator 301 just before the burst gate signal BG is inverted to the low level and supplies to the LPF 303. An output voltage of the LPF 303 is set to a control voltage of the VCO 304. The oscillation signal of the VCO 304 is a signal in which an oscillating frequency is equal to 3.58 MHz and the continuity of the phase alternation is maintained and the oscillation signal is supplied to the RGB encoder 23 as mentioned above.

In the above construction, the read RF signal generated from the pickup 2 is transmitted to the HPF 3, by which only the video signal band component is derived and supplied to the FM detecting circuit 4. The video signal demodulated by the FM detecting circuit 4 is supplied to the CCD 5, by which a jitter component is eliminated in accordance with the oscillation signal of the PLL circuit 15. After that, the video signal is supplied to the A/D converter 6 and sync separating circuit 14. The video data as a digital video signal generated from the A/D converter 6 is supplied to the memory controller 7. The memory controller 7 sequentially designates the write addresses in the image memory 8 in accordance with the horizontal sync signal DHS and vertical sync signal DVS which were separate by the sync separating circuit 14 and the reference clock signal RCL from the VCO 183 and writes the video data to the memory positions of the write addresses. For example, the video data of 910 pixels per 1H (horizontal scanning period) is consequently written.

Read addresses of the image memory 8 are sequentially designated by the memory controller 7 in accordance with the first horizontal and vertical sync signals $HS_1$ and $VS_1$ and the reference clock signal RCL from the VCO 183 and the video data of one pixel is readout from the read addresses. The read-out video data is converted into the analog video signal by the D/A converter 9. The analog video signal is mixed by the mixer 10 to the first composite sync signal $CS_1$ according to the video signal format of the NTSC system from the sync signal generating circuit 11 and is generated as a play composite video signal derived by playing the disc. The composite video signal is supplied to the mixer 13 through the delay circuit 12.

The RGB data indicative of the color tone of the graphics video image generated from the RGB digital data generating circuit 21 is converted into the analog RGB signal by the RGB-D/A converting circuit 22. After that, the analog RGB signal is supplied to the RGB encoder 23 through the delay circuits 24 to 26 every RGB. The RGB encoder 23 converts the analog RGB signal into the graphics composite video signal in accordance with the second horizontal and vertical sync signals $HS_2$ and $VS_2$ and the oscillation signal of 3.58 MHz. The oscillation signal of 3.58 MHz is set to a reference signal to produce a chrominance signal of the graphics composite video signal.

The graphics composite video signal is mixed to the play composite video signal by the mixer 13 and the resultant signal is sent to a CRT display device (not shown).

In the burst discontinuity detecting circuit 19, the video signal generated from the mixer 10 is transmitted through the binary coding circuit 192, so that a square wave signal is derived. The reference clock signal RCL of a frequency of $4 f_{SC}$ from the VCO 183 is frequency divided into ¼ by the frequency divider 191, so that a square wave signal of a frequency of $f_{SC}$ is obtained. The exclusive OR of both of the above square wave signals is got by the exclusive OR circuit 193. An output signal of the exclusive OR circuit 193 is set to the high level only when the levels of both of the above square wave signals are equal. The sampling circuit 194 holds the output signal of the exclusive OR circuit 193 synchronously with the reference clock signal RCL by five samples and generates. When three or more of the holding outputs of five samples are set to the high level, the majority circuit 195 generates a high level signal. When three or more of the five holding outputs are at the low level, the majority circuit 195 generates a low level signal. An output signal of the majority circuit 195 is held into the sampling circuit 196 by five samples in accordance with the first horizontal sync signal $HS_1$. When three or more of the holding outputs of five samples from the sampling circuit 196 are at the high level, it is regarded that the continuity of the phase alternation of the color burst signal of the video signal generated from the mixer 10 is maintained, so that the majority circuit 197 generates a high level signal. When three or more of the five holding outputs are at the low level, it is regarded that the continuity of the phase alternation of the color burst signal is not maintained, so that the majority circuit 197 generates a low level signal. An output signal of the majority circuit 197 is supplied to the delay circuits 12 and 24 to 28 as a detection signal of the burst discontinuity detecting circuit 19.

In the delay circuit 12, when the detection signal of the detecting circuit 19 is at the high level, the switch 122 is switched to a non-delay side a, so that a through state is obtained. When the detection signal is at the low level, the switch 122 is switched to a delay side b, so that a delay state of about 140 nsec is obtained. The above operations are also similarly executed with respect to each of the delay circuits 24 to 28. since the delay circuit 12 is in the through state when the continuity of the phase alternation of the color burst signal is maintained, consequently, the play composite video signal which is generated from the mixer 10 is supplied to the mixer 13 as it is. Since the delay circuits 24 to 28 are also in the through state, the analog RGB signal from the RGB-D/A converting circuit 22 is directly supplied to the RGB encoder 23. The second horizontally and vertical sync signals $HS_2$ and $VS_2$ from the sync signal generating circuit 20 are also directly supplied to the RGB encoder 23. The RGB encoder 23 converts the analog RGB signal into the graphics composite video signal in accordance with the second horizontal and vertical sync signals $HS_2$ and $VS_2$ and the oscillation signal of 3.58 MHz and supplies to the mixer 13. In the mixer 13, therefore, the play composite video signal and the graphics composite video signal which have chroma signals of the same phase are mixed together.

When the continuity of the phase alternation of the color burst signal is not held, the delay circuit 12 is in the delay state of about 140 nsec, so that the play composite video signal which is generated from the mixer 10 is delayed by about 140 nsec and is supplied to the mixer 13. Since the delay circuits 24 to 28 are also in the delay state of about 140 nsec, the analog RG signal from the RGB-D/A converting circuit 22 is delayed by about 140 nsec and is supplied to the RGB encoder 23. The second horizontal and vertical sync signals $HS_2$ and $VS_2$ from the sync signal generating circuit 20 are also delayed by about 140 nsec and supplied to the RGB encoder 23. The RGB encoder 23 converts the delayed analog RGB signal into the graphics composite video signal in accordance with the delayed second horizontal and vertical sync signals $HS_2$ and $VS_2$ and the oscillation signal of 3.58 MHz and supplies to the mixer 13. In the mixer 13, accordingly, the play composite video signal and the graphics composite video signal are mixed in a state that the phases of the chroma signals are equal.

Figure 3:
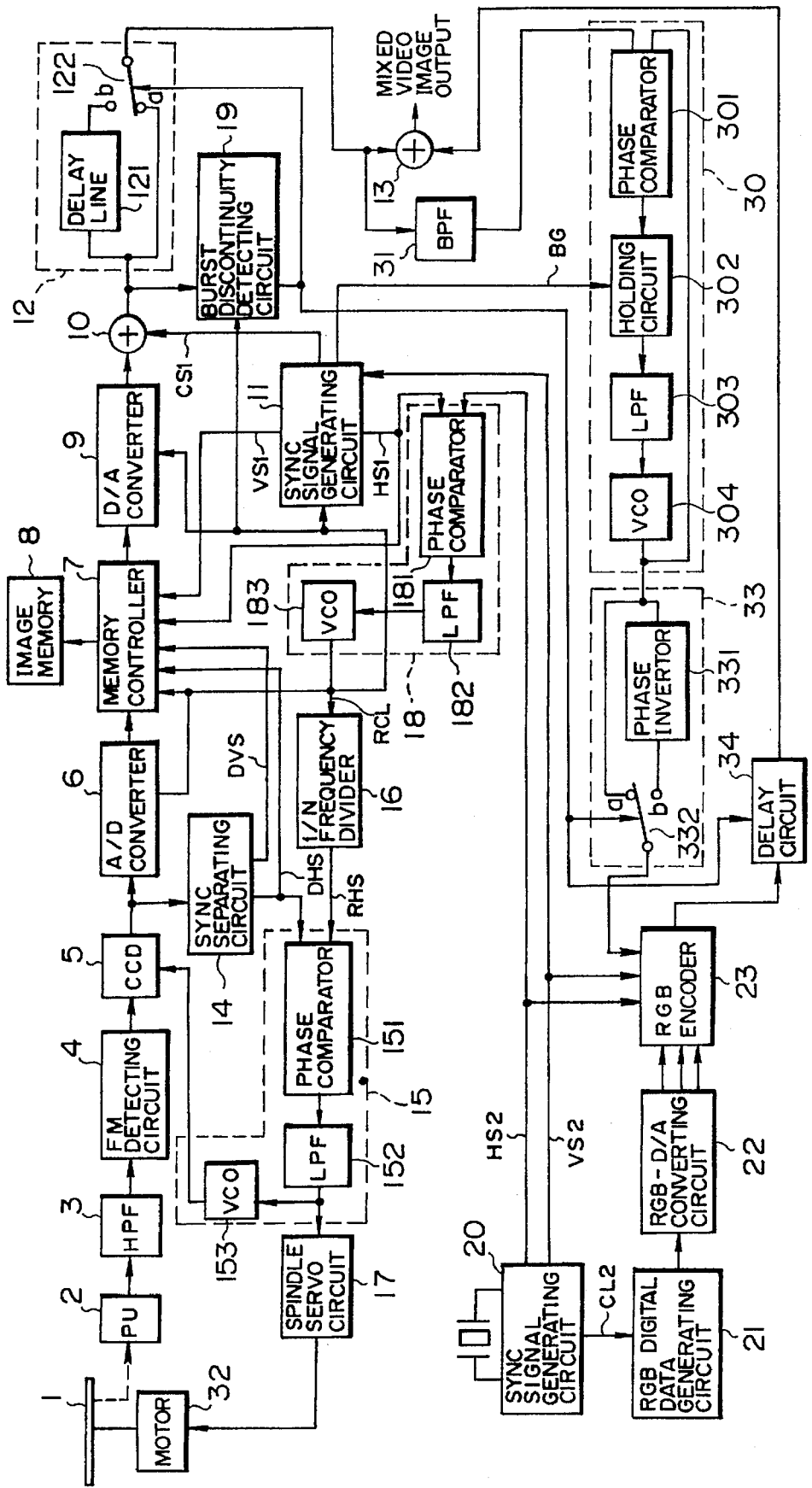
FIG. 3 is a block diagram showing another embodiment of the invention.

FIG. 3 shows another embodiment of a video image mixing apparatus according to the first aspect of the invention. In FIG. 3, the same portions as those shown in the apparatus of FIG. 1 are designated by the same reference numerals. The oscillation signal of 3.58 MHz of the PLL circuit 30 is supplied to the RGB encoder 23 through a phase inverting circuit 33. The phase inverting circuit 33 comprises a phase invertor 331 and a switch 332. The phase invertor 331 inverts the phase of the oscillation signal of 3.58 MHz. When the detection signal of the burst discontinuity detecting circuit 19 is at the high level, the switch 332 is switched to a non-inverting side (a) and relays the oscillation signal of 3.58 MHz as it is to the RGB encoder 23. When the detection signal of the burst discontinuity detecting circuit 19 is at the low level, the switch 332 is switched to an inverting side (b) and relays the phase inverted signal of the oscillation signal of 3.58 MHz from the phase invertor 331 to the RGB encoder 23. The output of the RGB encoder 23 is supplied to the mixer 13 through a delay circuit 34. The delay circuit 34 has a construction similar to that of the delay circuit 12. The other construction of the video image mixing apparatus of FIG. 3 is substantially similar to that of the apparatus shown in FIG. 1 except that the RGB encoder 23 doesn't have the delay circuits 24 to 28 and that the analog RGB signal and the sync signals are directly supplied to the RGB encoder 23.

In the above construction, when the continuity of the phase alternation of the color burst signal is maintained, the oscillation signal of 3.58 MHz from the PLL circuit 30 is directly supplied to the RGB encoder 23 and the graphics composite video signal generated from the RGB encoder 23 is directly supplied to the mixer 13. When the continuity of the phase alternation of the color burst signal is not maintained, the phase of the oscillation signal of 3.58 MHz of the PLL circuit 30 is inverted by the phase inverting circuit 33 and the inverted signal is supplied to the RGB encoder 23 subsequently. The phase of the signal in this instance is the same as that of the chroma signal of the play composite video signal generated from the mixer 10. Since the RGB encoder 23, therefore, forms the chroma signal component on the basis of the phase inverted oscillation signal of 3.58 MHz, the phase of the chroma signal is the same as that of the chroma signal of the play composite video signal generated from the mixer 10. Since the play composite video signal is delayed by about 140 nsec by the delay circuit 12, the graphics composite video signal generated from the RGB encoder 23 is also delayed by about 140 nsec by the delay circuit 34. After that, the delayed signal is supplied to the mixer 13. In the mixer 13, consequently, the play composite video signal and the graphics composite video signal are mixed in a state in which the phases of the chroma signals are equal.

Figure 4:
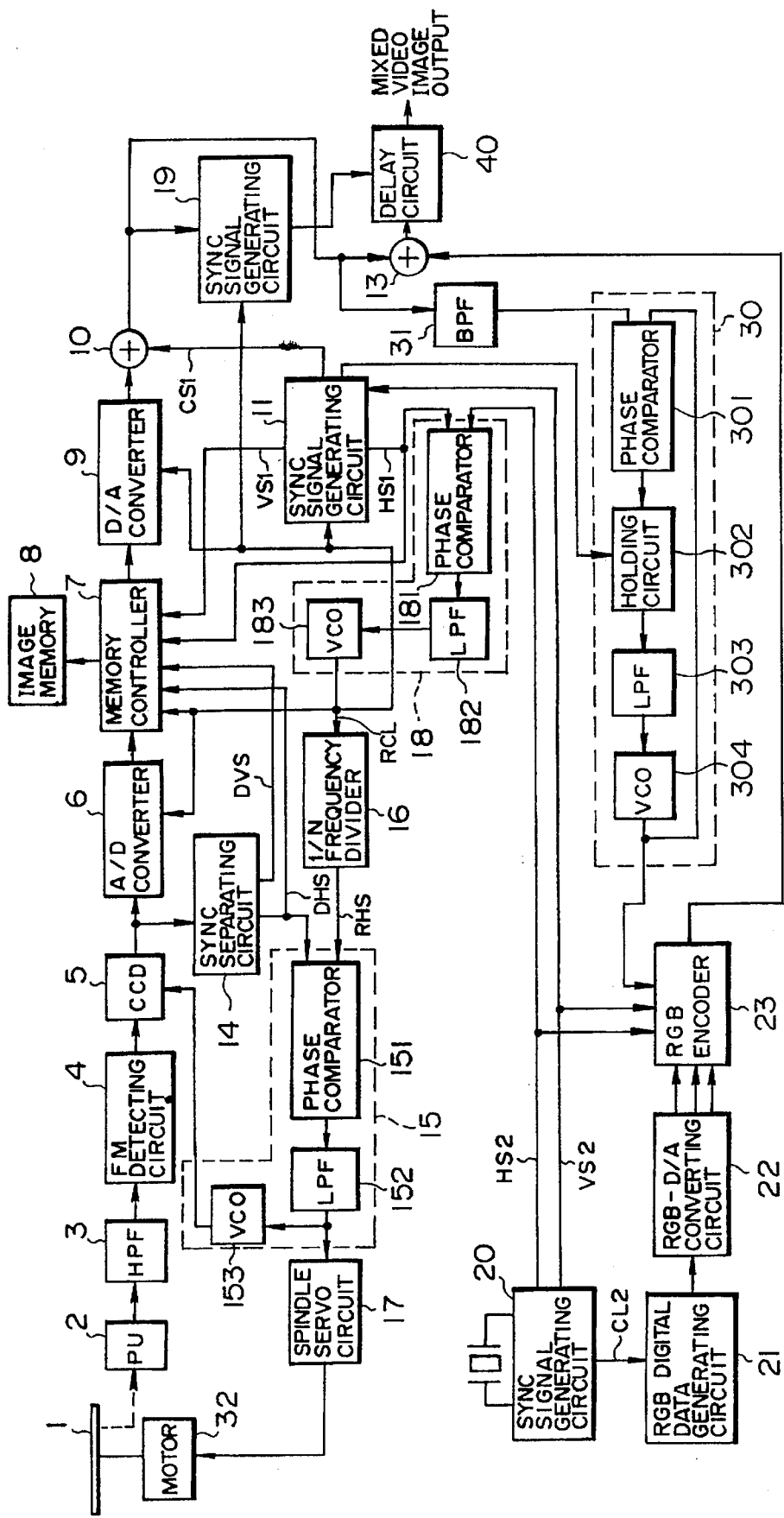
FIG. 4 is a block diagram showing further another embodiment of the invention.

FIG. 4 shows an embodiment of a video image mixing apparatus according to the second aspect of the invention. In FIG. 4, the same portions as those shown in the apparatus of FIG. 3 are designated by the same reference numerals. The output signals of the mixer 10 is directly sent to the mixer 13 and the BPF 31 and the output of the RGB encoder 23 is also directly sent to the mixer 13. The mixed signal of the play composite video signal and the graphics composite video signal is generated through a delay circuit 40. The delay circuit 40 has a construction similar to that of the delay circuit 12 in FIG. 3 and a delay control of about 140 nsec is executed on the basis of the detection signal of the burst discontinuity detecting circuit 19. The other construction of the apparatus of FIG. 4 is substantially similar to that of the apparatus shown in FIG. 3 except that the phase inverting circuit 33 is omitted and that the output of the PLL circuit 30 is directly supplied to the RGB encoder 23.

In the above construction, since the PLL circuit 30 supplies the oscillation signal of 3.58 MHz to the RGB encoder 23 in accordance with the phase of the color burst signal which is receiver, the graphics composite video signal having the chroma signal component of the same phase as that of the chroma signal of the play composite video signal generated from the mixer 10 is sent to the mixer 13 from the RGB encoder 23 irrespective of whether the continuity of the phase alternation of the color burst signal is held or not. In the mixer 13, the play composite video signal which is generated from the mixer 10 and the graphics composite video signal which is generated from the RGB encoder 23 are mixed in an in-phase state and the resultant mixed signal is supplied to the delay circuit 40. When the continuity of the phase alternation of the color burst signal of the play composite video signal is not maintained, since the signal is delayed by about 140 nsec by the delay circuit 40, a mixed video image in which the phase alternation of the chroma signal has a continuity is derived.

In the embodiment shown in FIG. 4 as mentioned above, the apparatus is constructed so that, after the graphics composite video signal and the play composite video signal are mixed in a state in which the phase of those chroma signals are equal, the continuity of the phase alternation of the chroma signal is maintained. The circuit construction, consequently, can be simplified and the stable mixed video image can be obtained.

Although each of the above embodiments has been shown an described with respect to the example in which the RGB data indicative of the color tone of the graphics video image is generated from the RGB digital data generating circuit 21 having the internal memory, it is also possible to construct in a manner such that a recording medium such as a video disc 1 or the like is used as means for storing the RGB data and the reading operation of the RGB data is controlled in accordance with a program which is likewise recorded on the video disc 1.

Although each of the above embodiments has been described with respect to the case of using the video disc as a recording medium, the invention can be also applied to the case of playing another recording medium such as a tape or the like on which the video signal has been recorded.

In the video image mixing apparatus according to the first aspect of the invention as mentioned above, when the discontinuity of the phase alternation of the color burst signal in the playback video signal is detected, the playback video signal and the graphics video signal are delayed by a predetermined time period respectively and the delayed signals are mixed subsequently. In the video image mixing apparatus according to the second aspect of the invention, when the discontinuity of the phase alternation of the color burst signal in the playback video signal is detected, the mixed video signal of the playback video signal and the graphics video signal is delayed by the predetermined time period and transmitted for output. Even in a special playing mode such as a reproducing mode of a still image or the like, accordingly, since the phases of the chroma signals of the video signals are equal, a fluctuation of the video image is prevented and a stable mixed video image can be obtained.

What is claimed is:

1. A video image mixing apparatus for mixing a playback video signal obtained by playing a recording medium and a graphics video signal produced on the basis of image data read-out from a memory device, comprising:

phase discontinuity detecting means for detecting a discontinuity of a phase alternation of a color burst signal in said playback video signal, thereby generating a discontinuity detection signal;

first delay means for delaying the playback video signal by a predetermined time period;

second delay means for delaying said graphics video signal by said predetermined time period; and mixing means for mixing the playback video signal outputted from said first delay means and the graphics video signal outputted from said second delay means when said discontinuity detection signal is generated.

2. A video image mixing apparatus for mixing a playback video signal obtained by playing a recording medium and a graphics video signal produced on the basis of image data read-out from a memory device comprising:

phase discontinuity detecting means for detecting a discontinuity of a phase alternation of a color burst signal in said playback video signal, thereby generating a discontinuity detection signal;

mixing means for producing a mixed video signal of said playback video signal and said graphics video signal; and delay means for delaying said mixed video signal from said mixing means by a predetermined time period when said phase discontinuity detection signal is generated and for outputting a delayed mixed video signal.

3. A video image mixing apparatus as claimed in claim 1, wherein said predetermined time period is a half of a period of said color burst signal in said playback video signal.

4. A video image mixing apparatus as claimed in claim 2, wherein said predetermined time period is a half of a period of said color burst signal in said playback video signal.

* * * * *